United States Patent
Korthals

(10) Patent No.: US 7,458,311 B2
(45) Date of Patent: Dec. 2, 2008

(54) RETURN TO NEUTRAL FOR DUAL HYDROSTATIC TRANSMISSION

(75) Inventor: Douglas Dean Korthals, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 194 days.

(21) Appl. No.: 11/503,773

(22) Filed: Aug. 14, 2006

(65) Prior Publication Data

US 2008/0034958 A1    Feb. 14, 2008

(51) Int. Cl.
 *F01B 3/00* (2006.01)
 *F16D 31/02* (2006.01)
(52) U.S. Cl. .......................... 92/12.2; 60/328
(58) Field of Classification Search .................. 60/328, 60/399, 487; 92/12.2
 See application file for complete search history.

(56) References Cited

U.S. PATENT DOCUMENTS

| 4,531,365 | A | 7/1985 | Wanie | 60/328 |
| 5,586,955 | A | 12/1996 | Wanie | 477/99 |
| 5,921,142 | A | 7/1999 | Peter | 74/491 |
| 6,425,244 | B1 * | 7/2002 | Ohashi et al. | 60/486 |
| 6,449,934 | B1 | 9/2002 | Reimers et al. | 56/14.7 |
| 6,454,032 | B1 | 9/2002 | Teal et al. | 180/6.62 |
| 6,487,857 | B1 | 12/2002 | Poplawski et al. | 60/487 |
| 6,662,895 | B1 | 12/2003 | Bednar | 180/308 |
| 6,848,532 | B2 | 2/2005 | Korthals | 180/367 |
| 6,935,106 | B2 | 8/2005 | Korthals | 60/399 |
| 2005/0044850 | A1 * | 3/2005 | Korthals | 60/487 |

* cited by examiner

*Primary Examiner*—Michael Leslie

(57) ABSTRACT

A return to neutral mechanism for a dual hydrostatic transmission includes a plurality of return to neutral control arms, each return to neutral control arm biased toward a neutral position. Each return to neutral control arm moves in response to forward or reverse movement of an operator control, such as a stick or foot pedal. Additionally, switches are mounted to the return to neutral control arms. The switches enable starting of the engine if every return to neutral control arm is in a neutral position, and disable starting of the engine if at least one return to neutral control arm is out of the neutral position.

19 Claims, 9 Drawing Sheets

US 7,458,311 B2

RETURN TO NEUTRAL FOR DUAL HYDROSTATIC TRANSMISSION

FIELD OF THE INVENTION

This invention relates generally to hydrostatic drives for grass mowing machines, and more return to neutral mechanisms for dual hydrostatic transmissions.

BACKGROUND OF THE INVENTION

A grass mowing machine may include a motor or engine that transmits power to left and right traction drive wheels through a dual hydrostatic transmission. The operator may use a pair of controls connected to the dual hydrostatic transmission to control machine speed and direction. Examples of grass mowing machines with dual hydrostatic transmissions to control speed and direction are zero turning radius mowers, walk-behind mowers, stand-behind mowers and other riding mowers.

A dual hydrostatic transmission may include two hydrostatic pumps in one housing, each pump having an input control or trunion shaft. Each input control or trunion shaft may be operatively connected to a swash plate in one of the pumps. Each pump may be connected to a hydrostatic motor that turns a drive wheel. Each input control or trunion shaft may be pivoted in a first rotary direction to move the swash plate in the pump for propelling a traction drive wheel on the vehicle forward, and may be pivoted in an opposite rotary direction to move the swash plate and propel the traction drive wheel in the reverse direction. Each input control or trunion shaft and swash plate may have a forward drive pivot direction, an opposite reverse drive pivot direction, and a neutral position between the forward drive and reverse drive pivot directions.

A dual hydrostatic transmission may include operator controls and linkages connected to each input control or trunion shaft to allow an operator to independently change the direction and speed of each drive wheel. For example, each operator control may be a pivotable stick or foot pedal, and the operator may use the pair of sticks or foot pedals to control speed and direction of the machine. Additionally, each linkage may include a return to neutral mechanism that urges the input control or trunion shaft and swash plate toward the neutral position when the operator releases the stick or foot pedal. Optionally, each operator control also may have a damper to help control motion.

Return to neutral mechanisms may be connected to electrical circuits that prevent the engine or other power source from being started if the transmission is in a driving, non-neutral mode, and thereby generally prevent the vehicle from lunging forward when started. Examples of return to neutral mechanisms are shown in U.S. Pat. Nos. 6,935,106, 5,586,955 and 4,531,365.

Return to neutral mechanisms for dual hydrostatic transmissions require numerous mechanical linkages and other components. The device must return the pump to mechanical neutral from both the forward and reverse motion positions. A return to neutral mechanism for a dual hydrostatic pump is needed having a low number of components.

Mechanical linkages and other components for a dual hydrostatic pump's return to neutral mechanism are costly to assemble, service and adjust in the field. A return to neutral mechanism for a dual hydrostatic pump is needed that is economical to assemble, service and adjust.

SUMMARY OF THE INVENTION

A return to neutral mechanism for a dual hydrostatic transmission includes return to neutral control arms, each return to neutral control arm biased toward a neutral position. Each return to neutral control arm moves in response to movement of an operator control, such as a stick or foot pedal. Switches are mounted to the return to neutral control arms. The switches enable starting of the engine if every return to neutral control arm is in a neutral position, and disable starting of the engine if at least one return to neutral control arm is out of the neutral position. The return to neutral mechanism has a low number of components, and is easy and economical to assemble, service and adjust.

DESCRIPTION OF THE PREFERRED EMBODIMENT

Figure 1:
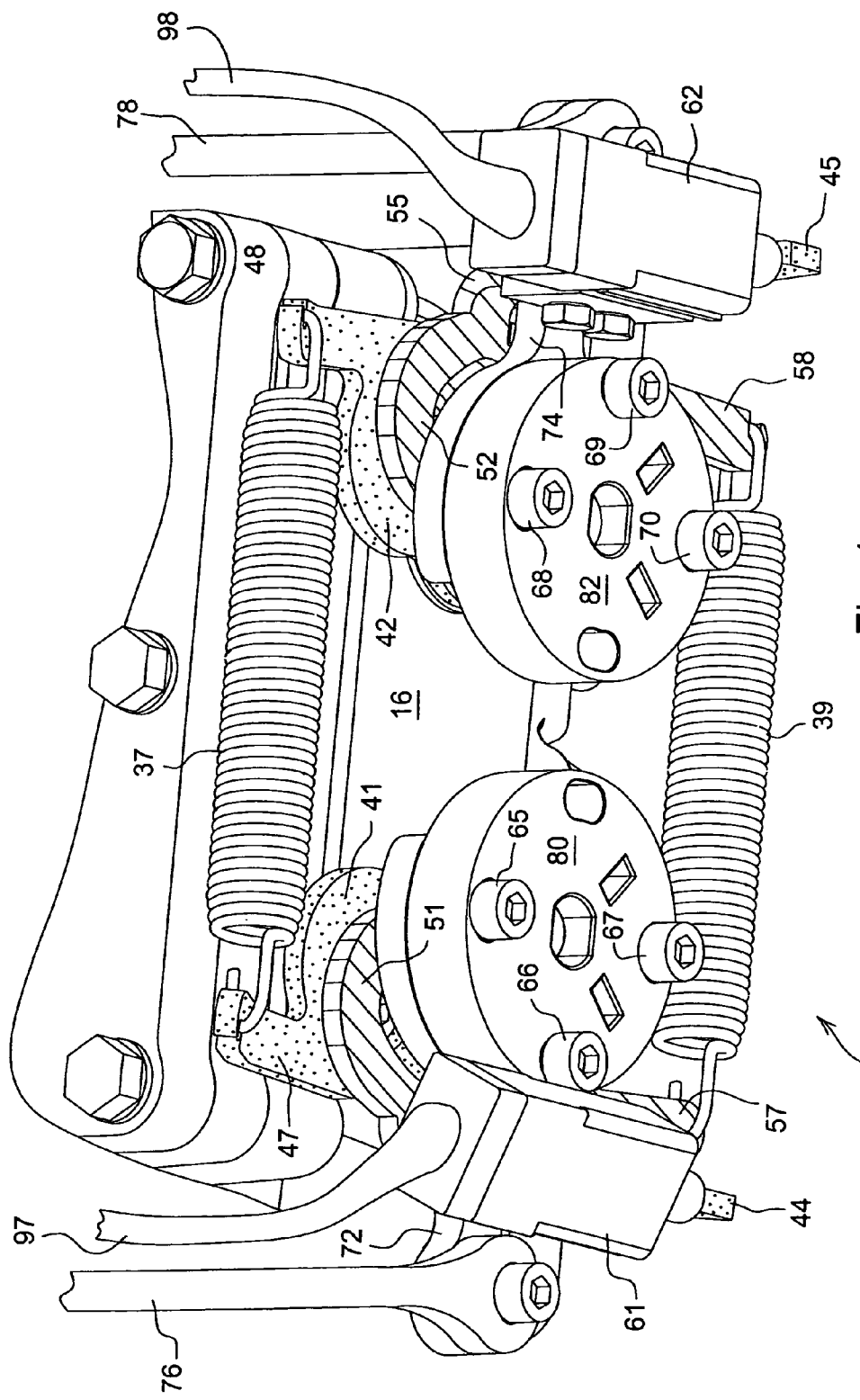
FIG. 1 is a perspective view of a return to neutral mechanism for a dual hydrostatic pump according to one embodiment of the invention.
Figure 2:
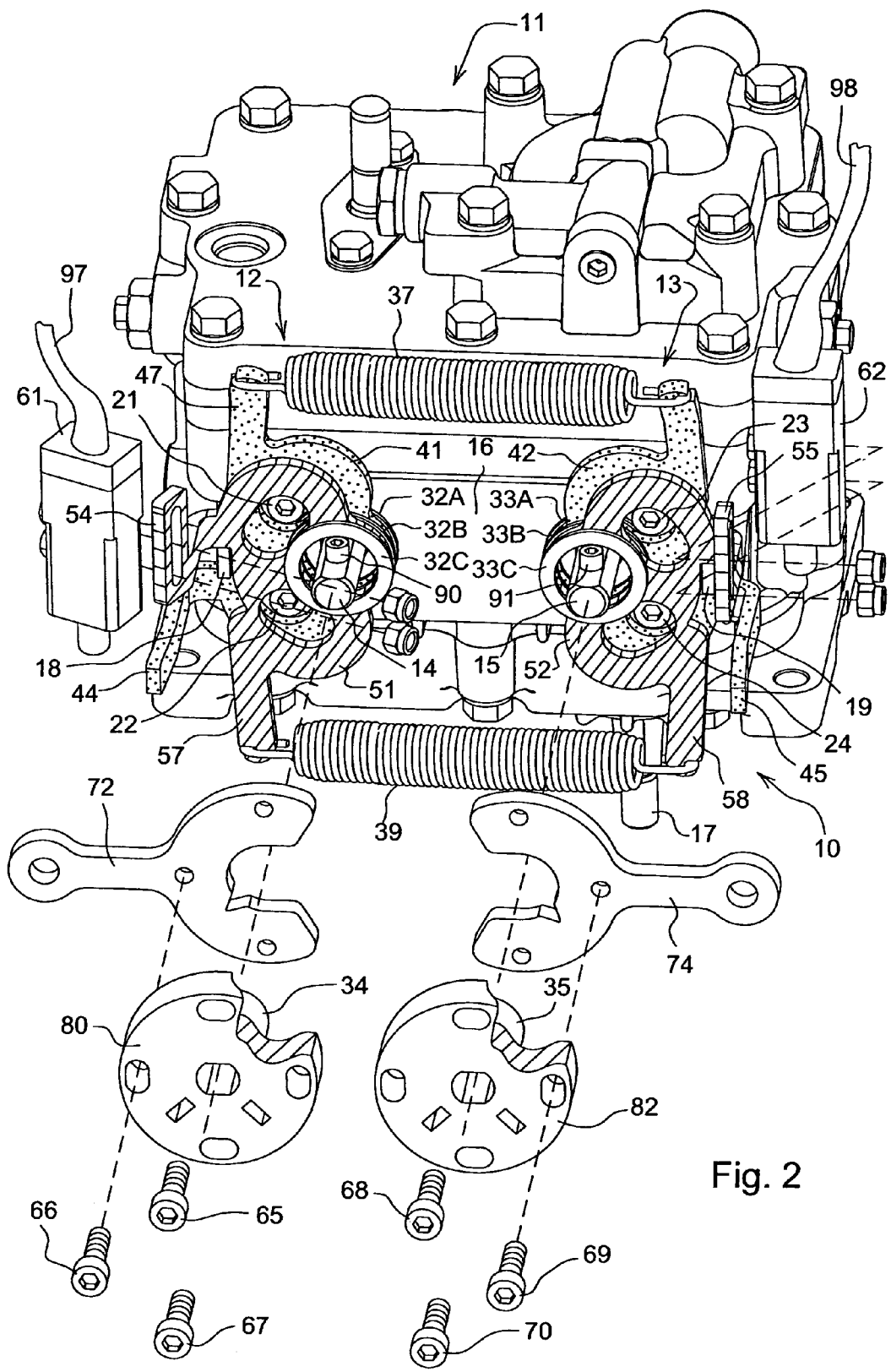
FIG. 2 is a partially exploded perspective view of a return to neutral mechanism for a dual hydrostatic pump according to one embodiment of the invention.
Figure 3:
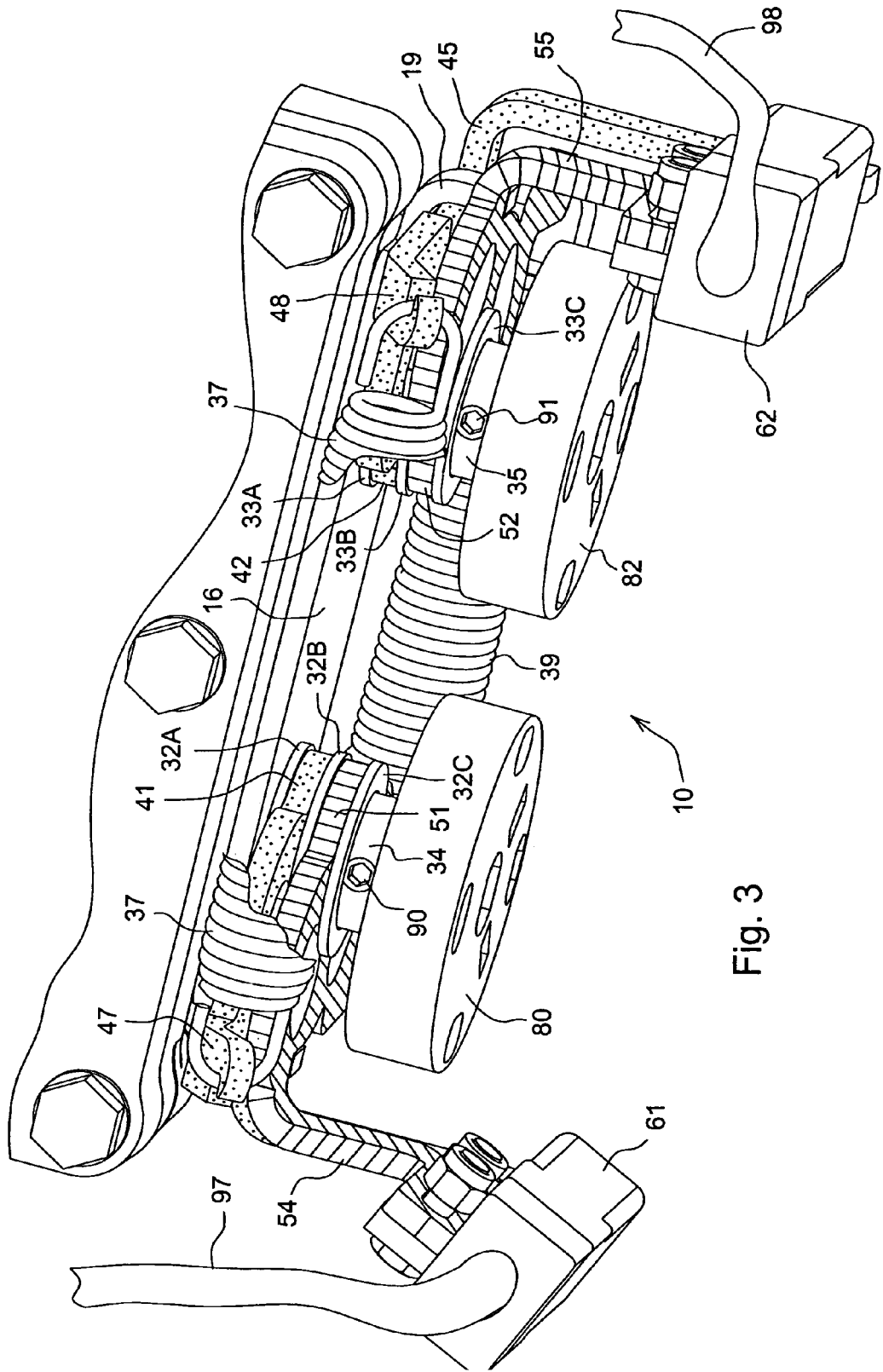
FIG. 3 is a top perspective view of a return to neutral mechanism for a dual hydrostatic pump without operator controls and input control levers, according to one embodiment of the invention.

FIGS. 1-3 show one embodiment of return to neutral mechanism 10 mounted to dual hydrostatic pump 11 housing a pair of hydrostatic pumps 12, 13. Alternatively, return to neutral mechanism 10 may be mounted to a pair of hydrostatic pumps that are side-by-side. Each hydrostatic pump 12, 13 may be connected by a fluid conduit to a hydrostatic motor that rotates a traction drive wheel on a grass mowing machine, preferably a left wheel and a right wheel. The amount and direction of flow of hydraulic fluid between each pump 12, 13 and its motor is controlled by operator controls 76, 78. The operator controls may be independently movable controls such as a pair of sticks or foot pedals, one for each pump. Pushing both operator controls in a forward direction may cause both traction drive wheels to rotate forward. Pulling both operator controls to the rear causes both wheels to rotate in reverse. Pushing one operator control forward while leaving the other in the neutral position causes only one wheel to rotate and the mower will turn. If one operator control is pushed forward and the other is pulled back, the mower will rotate about a center point between the two wheels. When both operator controls are released, the wheels stop rotating due to dynamic braking, and the mower may come to a stop.

In one embodiment, operator controls 76, 78 may be pivotable sticks that an operator may use to control speed and direction of a left traction drive wheel and a right traction drive wheel respectively. Operator controls 76, 78 may be pivotably connected to input control levers 72, 74. The left and right input control levers 72, 74 may be attached to trunion shafts 14, 15. Left hydrostatic pump 12 may have left input control or trunion shaft 14 and right pump 13 may have right input control or trunion shaft 15. Turning an input control lever may pivot an internal swash plate (not shown) inside the hydrostatic pump to direct hydraulic fluid flow and thus change the rotational speed of the hydrostatic motor that turns a drive wheel. The dual hydrostatic pump also may have a vertical input shaft 17 that may be rotated by an internal combustion engine or other power supply source (not shown), through a belt and pulley arrangement.

In one embodiment, return to neutral mechanism 10 may include upper return to neutral control arms 41, 42 and lower return to neutral control arms 51, 52. Each return to neutral control arm may be connected to another return to neutral control arm by a spring 37, 39 biasing both arms toward a neutral position. Each return to neutral control arm moves in response to movement of an operator control 76, 78, such as a stick or foot pedal. Additionally, the return to neutral mechanism may include switches 61, 62 mounted to the return to neutral control arms. The switches enable starting of the engine if every return to neutral control arm is in a neutral position, and disable starting of the engine if at least one return to neutral control arm is out of the neutral position.

In one embodiment, return to neutral mechanism 10 may urge each pump 12, 13 to return to its hydraulic neutral position from either a forward or reverse position, as well as simultaneously sense whether or not the pumps are in their neutral position. A first pair of return to neutral control arms 41, 51 pivots around hub 34 on an axis that is coaxial with and independent of trunion shaft 14. One of the first pair of return to neutral control arms pivots in a first direction if hydrostatic pump 12 is in forward, and the other of the first pair of return to neutral control arms pivots in a second direction if hydrostatic pump 12 is in reverse. A second pair of return to neutral control arms 42, 52 pivots around hub 35 on an axis that is coaxial with and independent of trunion shaft 15. One of the second pair of return to neutral control arms pivots in a first direction if hydrostatic pump 13 is in forward, and the other of the second pair of return to neutral control arms pivots in a second direction if hydrostatic pump 13 is in reverse. Springs 37, 39 bias the return to neutral control arms toward a mechanical neutral position. Switches 61, 62 are mounted to one of the first pair of return to neutral control arms and one of the second pair of return to neutral control arms. Each switch is in a first state to enable starting of the engine only if all of the return to neutral control arms are in a mechanical neutral position.

In one embodiment, return to neutral mechanism 10 may include neutral locating plate 16 mounted to dual hydrostatic pump 11 using internal hex screws 21-24. The neutral locating plate may have a pair of tabs 18, 19, preferably a left tab extending from its left edge and a right tab extending from its right edge. Each tab 18, 19 may serve as a mechanical neutral locating stop for the return to neutral (RTN) control levers, as will be explained below. The neutral locating plate also may have a pair of openings through which left and right input control or trunion shafts 14, 15 may extend.

In one embodiment, pump trunion hubs 34, 35 may be mounted to left and right input control or trunion shafts 14, 15 and may drive the shafts using the operator controls. The pump trunion hubs may be mounted to the shafts with tapered internal hex set screws 90, 91. Each set screw may index into a tapered alignment hole in the shaft and secure the hub to the shaft. The set screws may be accessible for securing prior to mounting input control levers 72, 74 to flanges 80, 82 of hubs 34, 35.

In one embodiment, input control levers 72, 74 may be secured to flanges 80, 82 with internal hex screws 65-67 and 68-70. The hex screws may thread into input control levers 72, 74. Oval slots in flanges 80, 82 allow for indexing the pump's hydraulic neutral to the mechanical fixed neutral which the upper and lower RTN control arms reach when they contact tabs 18, 19 of the neutral locating plate. During assembly of the machine, the hex screws may secure the input control levers at various axial positions within the oval slots. The axial position of each input control lever 72, 74 may be varied relative to the axial position of each flange 80, 82. As a result, the mechanical neutral position of each input control lever 72, 74 and operator control 76, 78 can be adjusted to match the hydraulic neutral position of each hydrostatic pump 12, 13. Springs 37, 39 urge the upper and lower RTN control arms toward tabs 18, 19 which provide a stop defining the mechanical neutral position.

In one embodiment, pump trunion hubs 34, 35 may serve as centering pivot locations for frictionless washers 32A, 32B, 32C and 33A, 33B, 33C. The frictionless washers may be positioned between the return to neutral (RTN) control arms on the same pump trunion hub to allow the arms to freely pivot around the hub. The frictionless washers allow pivoting of the RTN control arms without undue resistance, and also maintain axial separation between the RTN control arms and provide proper alignment of components on the hubs.

In one embodiment, left upper RTN control arm 41 and right upper RTN control arm 42 pivot independently around pump trunion hubs 34, 35 respectively. The left upper RTN control arm and right upper RTN control arm each have a tab 44, 45 extending therefrom that contacts a respective tab 18, 19 of neutral locating plate 16 in the mechanical neutral position. Each upper RTN control arm 41, 42 includes an opening that fits around pump trunion hub 34, 35 to allow the upper RTN control arm to pivot. Spring 37 may be hooked in slots of legs 47, 48 extending from upper RTN control arms 41, 42. Spring 37 biases both upper RTN control arms together and toward their neutral positions, until tabs 44, 45 meet tabs 18, 19 respectively.

In one embodiment, each lower RTN control arm 51, 52 pivots in the opposite direction as each upper RTN control arm 41, 42 around the same hub. Left lower RTN control arm 51 and right lower RTN control arm 52 each have a tab 54, 55 extending therefrom that can contact a respective tab 18, 19 of neutral locating plate 16. Each lower RTN control arm 51, 52 includes an opening that fits around pump trunion hub 34, 35 to allow the lower RTN control arm to pivot. Spring 39 may be hooked in slots of legs 57, 58 extending from lower RTN control arms 51, 52. Spring 39 biases both lower RTN control arms together and toward their neutral positions, until tabs 54, 55 meet tabs 18, 19 respectively.

In one embodiment, electrical plunger switches 61, 62 may be mounted to slots in tabs 54, 55 of lower RTN control arms 51, 52. The electrical plunger switches may be provided with various switching logics to enable starting of a grass mowing machine only when all of the RTN control arms are at a neutral position. Optionally, the switches may enable other functions only if the operator controls are in the neutral position, such as disabling the engine if the park brake is set and the operator controls are moved out of the neutral position. Switches 61, 62 may be activated by pivoting either of the lower RTN control arms, separating the switch and a tab on the RTN control arm. The switches may be electronically connected via electrical conduits 97, 98 to a controller, circuit or other device (not shown) that can enable or disable the engine of a grass mowing machine.

Figure 4:
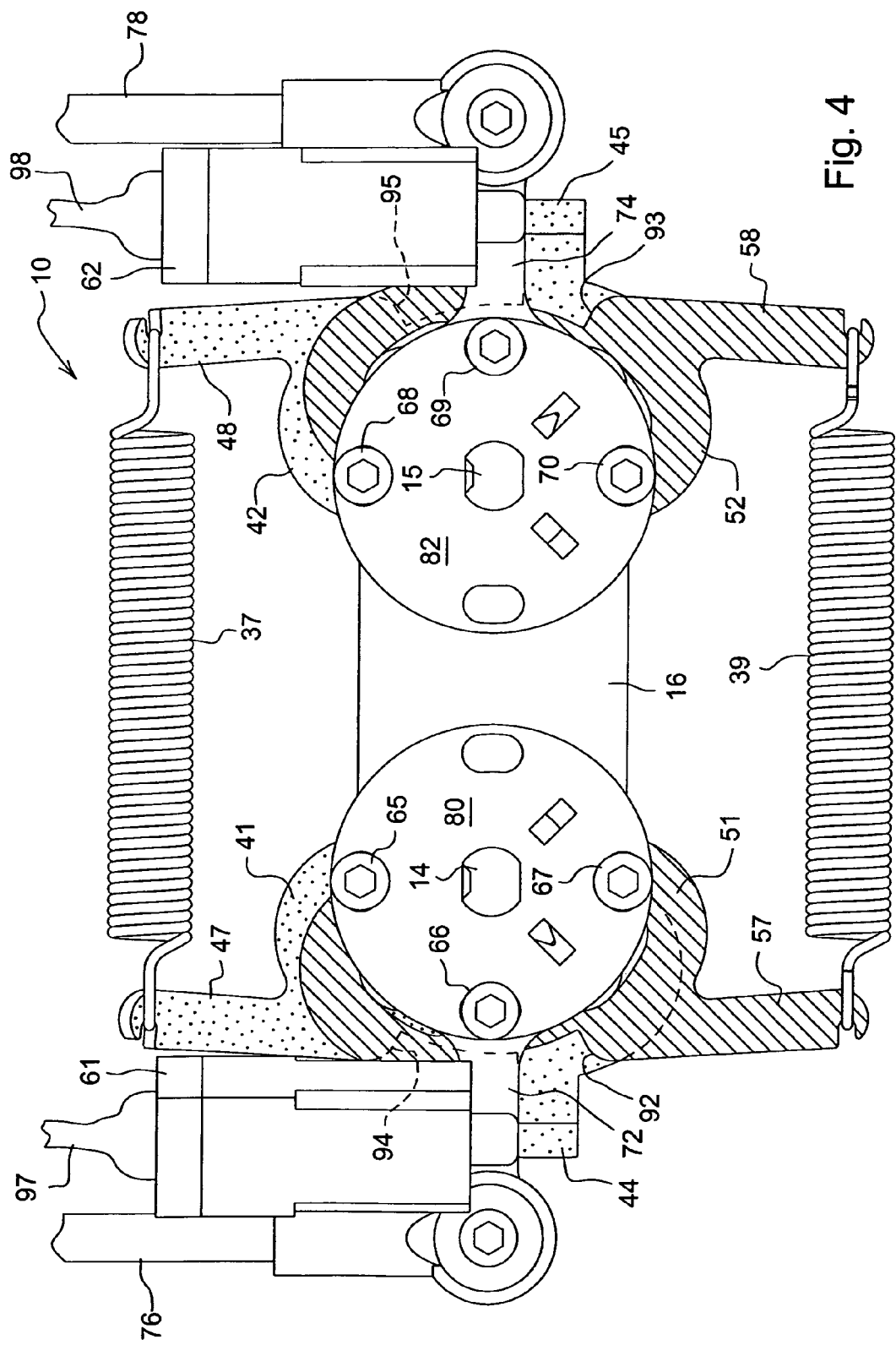
FIG. 4 is a side view of an embodiment of a return to neutral mechanism in which both the left and right pumps are in the neutral position.

FIG. 4 shows an embodiment of return to neutral mechanism 10 in which operator controls 76, 77 and control levers 72, 74 for both pumps are in a neutral position. Springs 37, 39 bias the upper and lower RTN control arms 41, 42 and 51, 52 to pivot to a position in which tabs 44, 45 and tabs 54, 55 are in contact with tabs 18, 19 on each side of neutral locating plate 16. In the mechanical neutral position, both plunger type switches 61, 62 may be in a first state, shown here as a compressed condition. For example, in the mechanical neutral position, the switches may complete a circuit required for engine starting and/or other machine functions that are enabled only in neutral.

Figure 5:
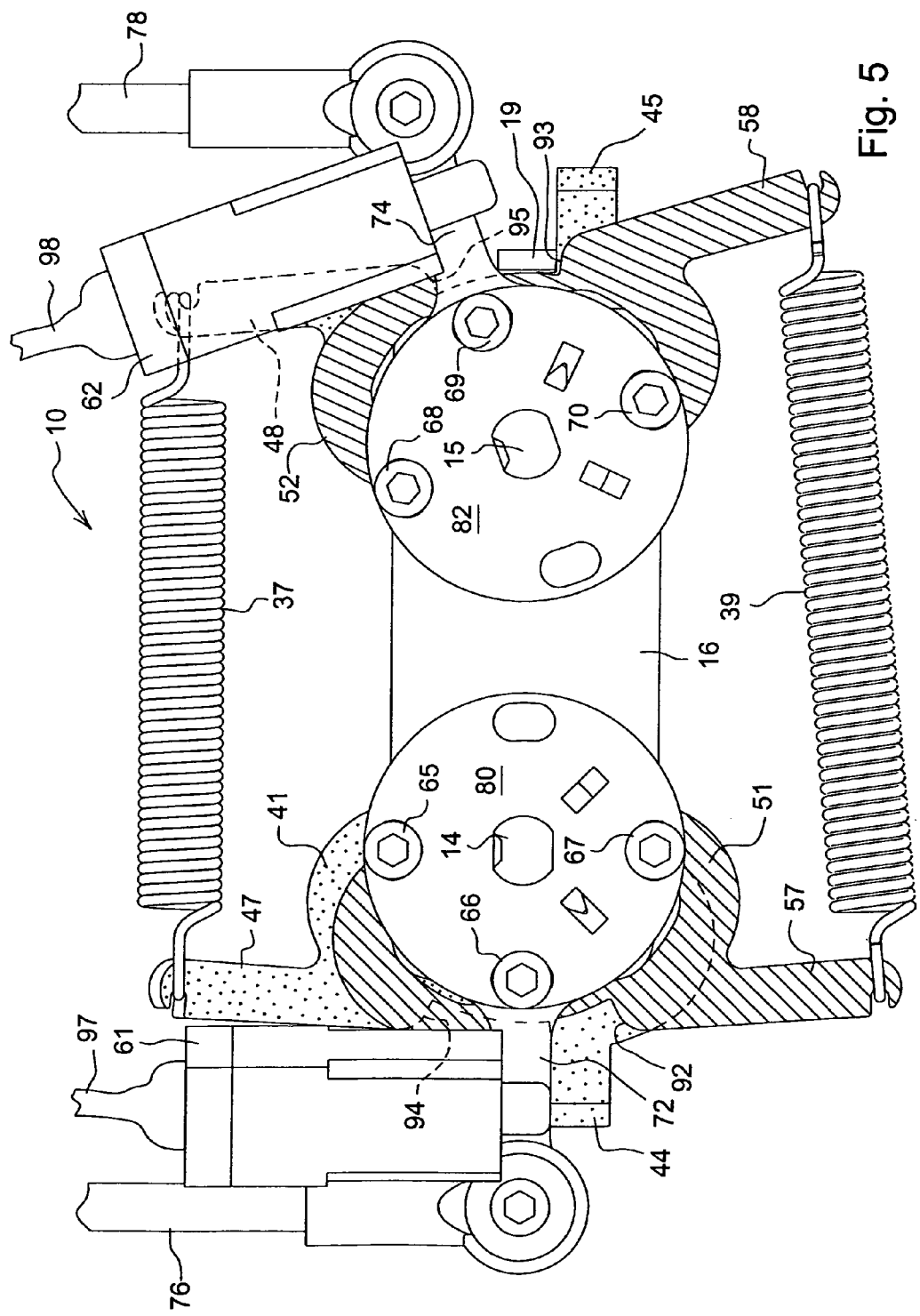
FIG. 5 is a side view of an embodiment of a return to neutral mechanism in which the left pump is in the neutral position and the right pump is in full forward.

FIG. 5 shows an embodiment of return to neutral mechanism 10 in which left operator control 76 and control lever 72 for the left pump are in neutral, and right operator control 78 and control lever 74 for the right pump are in the full forward position. Right input control lever 74 causes right lower RTN control arm 52 to pivot by contacting tab 55. Pivoting of right lower RTN control arm 52 also changes the state of plunger switch 62, here shown in a released or extended condition. This switch state may open a circuit to disable engine starting and/or other functions of the grass mowing machine. Pivoting of right lower RTN control arm 52 also stretches and extends spring 39 between legs 57 and 58 of lower RTN control arms 51, 52. Right lower RTN control arm 52 may reach a maximum or full forward position when shoulder 93 contacts tab 19 of neutral locating plate 16. Left lower RTN control arm 51, and both upper RTN control arms 41, 42, remain in their mechanical neutral positions. Tab 44 of left lower RTN control arm 51, and tabs 54, 55 of upper RTN control arms 41, 42, remain in contact with tabs 18, 19 of neutral locating plate 16.

Figure 6:
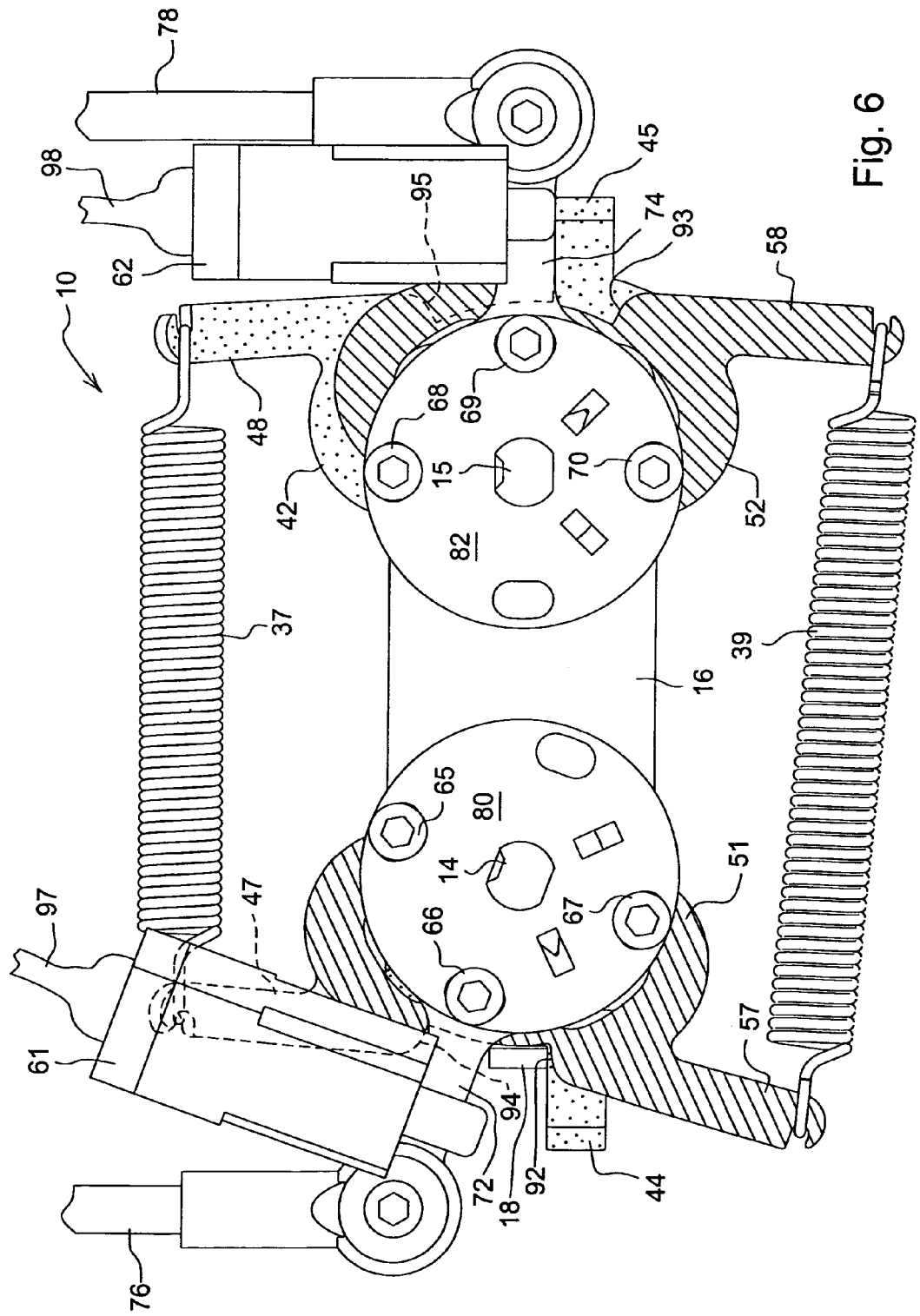
FIG. 6 is a side view of an embodiment of a return to neutral mechanism in which the right pump is in the neutral position and the left pump is in full forward.

FIG. 6 shows an embodiment of return to neutral mechanism 10 in which right operator control 78 and control lever 74 for the right pump are in neutral, and left operator control 76 and control lever 72 are in the full forward position. Left input control lever 72 causes left lower RTN control arm 51 to pivot by contacting tab 54. Pivoting of left lower RTN control arm 51 also changes the state of plunger switch 61, here shown in a released or extended condition. Pivoting of left lower RTN control arm 51 also stretches and extends spring 39 between legs 57 and 58 of the lower RTN control arms. Left lower RTN control arm 51 may reach a maximum or full forward position when shoulder 92 contacts tab 18 of neutral locating plate 16. Right lower RTN control arm 52, and both upper RTN control arms 41, 42, remain in their mechanical neutral positions. Tab 45 of right lower RTN control arm 52, and tabs 54, 55 of upper RTN control arms 41, 42, remain in contact with tabs 18, 19 of neutral locating plate 16.

Figure 7:
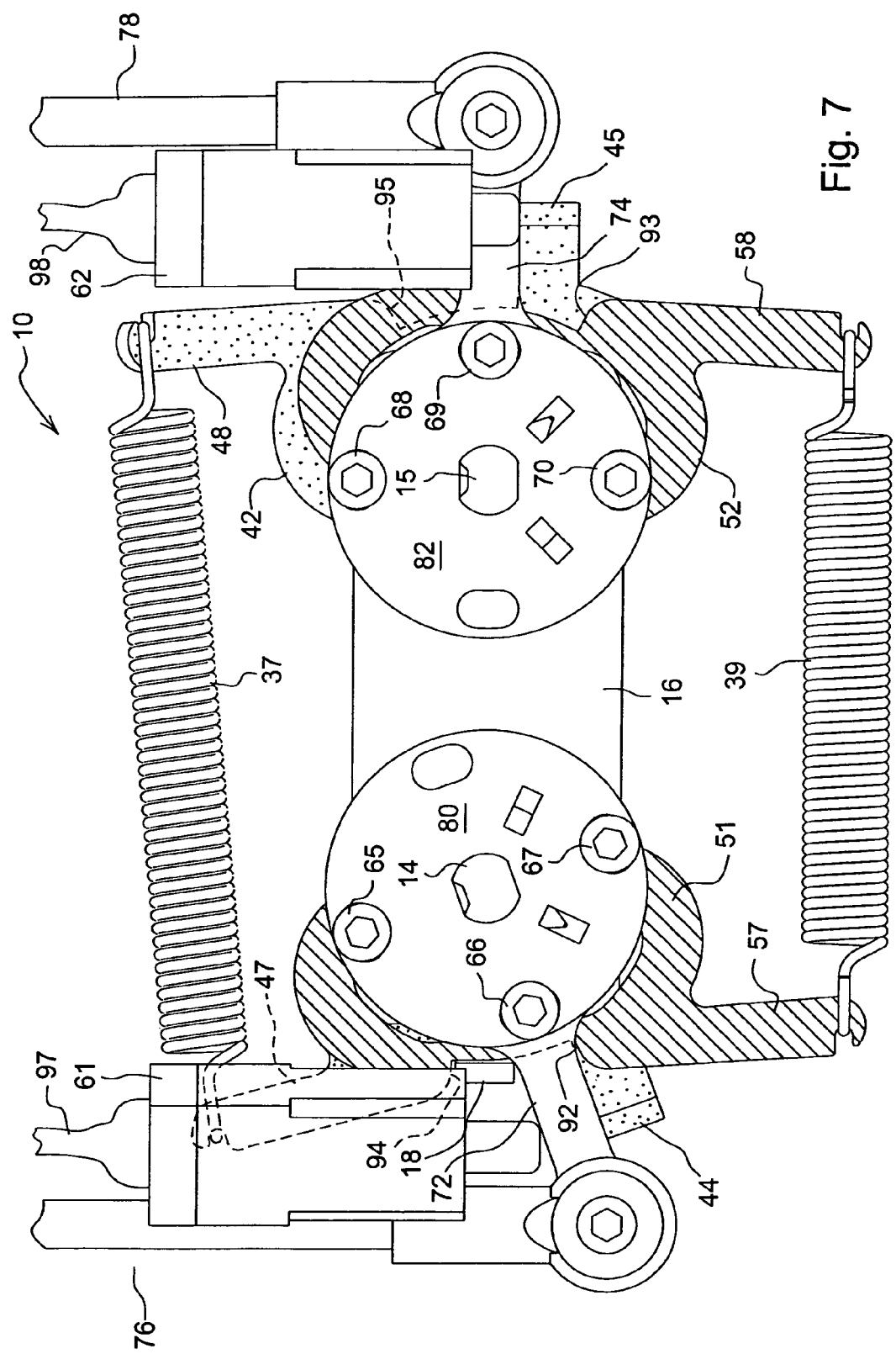
FIG. 7 is a side view of an embodiment of a return to neutral mechanism in which the right pump is in the neutral position and the left pump is in full reverse.

FIG. 7 shows an embodiment of return to neutral mechanism 10 in which right operator control 78 and control lever 74 for the right pump are in neutral, and left operator control 76 and control lever 72 are in the full reverse position. Left input control lever 72 causes left upper RTN control arm 41 to pivot by contacting tab 44. Pivoting of left upper RTN control arm 41 also changes the state of plunger switch 61, here shown in a released or extended condition. Pivoting of left upper RTN control arm 41 also stretches and extends spring 37 between legs 47 and 48 of the upper RTN control arms. Left upper RTN control arm 41 may reach a maximum or full reverse position when shoulder 94 contacts tab 18 of the neutral locating plate. Right upper RTN control arm 42, and both lower RTN control arms 51, 52, remain in their mechanical neutral positions. Tab 45 of right upper RTN control arm 42, and tabs 54, 55 of lower RTN control arms 51, 52, remain in contact with tabs 18, 19 of neutral locating plate 16.

Figure 8:
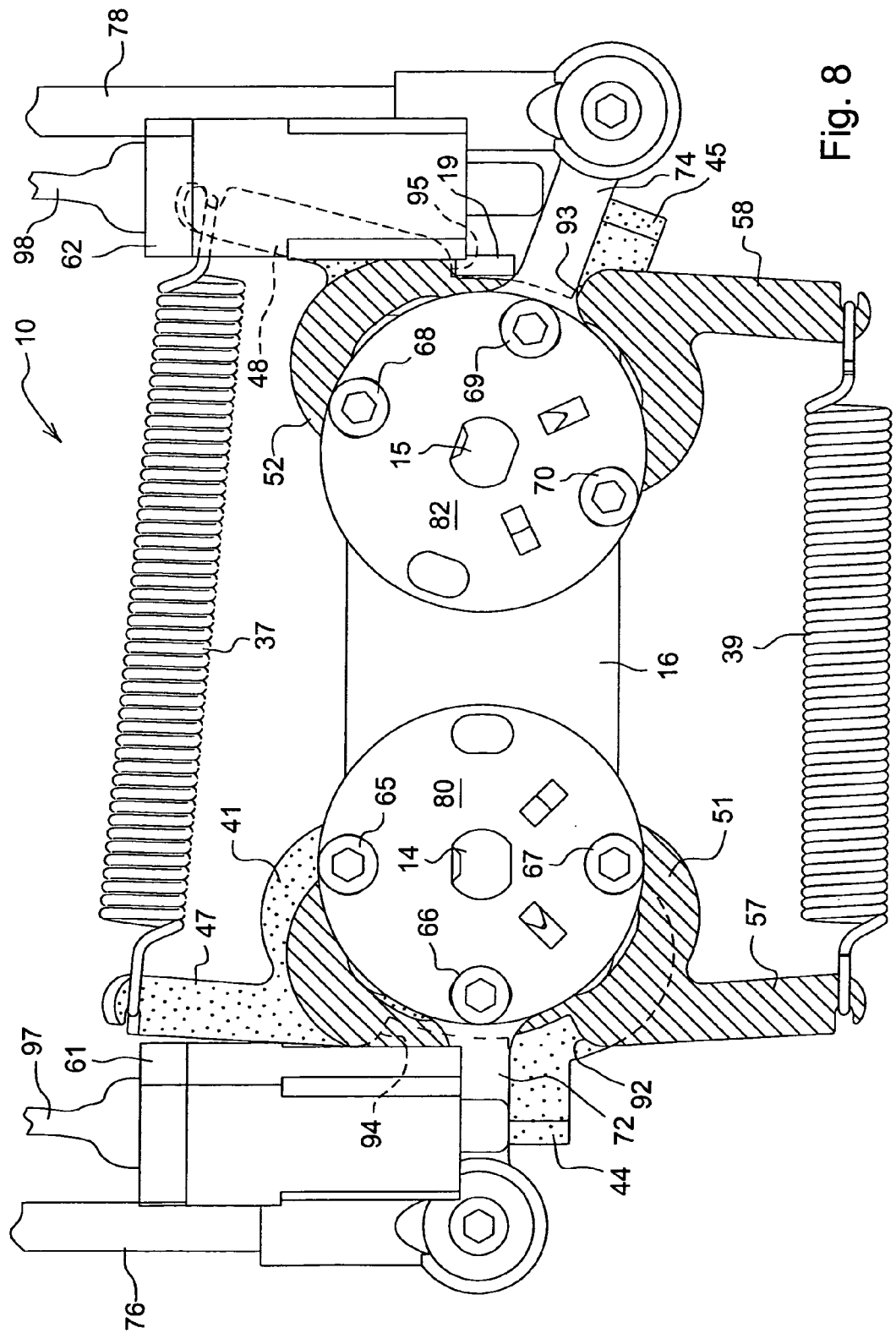
FIG. 8 is a side view of an embodiment of a return to neutral mechanism in which the left pump is in the neutral position and the right pump is in full reverse.

FIG. 8 shows an embodiment of return to neutral mechanism 10 in which left operator control 76 and control lever 72 for the left pump are in neutral, and right operator control 78 and control lever 74 are in the full reverse position. Right input control lever 74 causes right upper RTN control arm 42 to pivot by contacting tab 45. Pivoting of right upper RTN control arm 42 also changes the state of plunger switch 62, here shown in a released or extended condition. Pivoting of right upper RTN control arm 42 also stretches and extends spring 37 between legs 47 and 48 of the upper RTN control arms. Right upper RTN control arm 42 may reach a maximum or full reverse position when shoulder 95 contacts tab 19 of the neutral locating plate. Left upper RTN control arm 41, and both lower RTN control arms 51, 52, remain in their mechanical neutral positions. Tab 44 of left upper RTN control arm 41, and tabs 54, 55 of lower RTN control arms 51, 52, remain in contact with tabs 18, 19 of the neutral locating plate.

Figure 9:
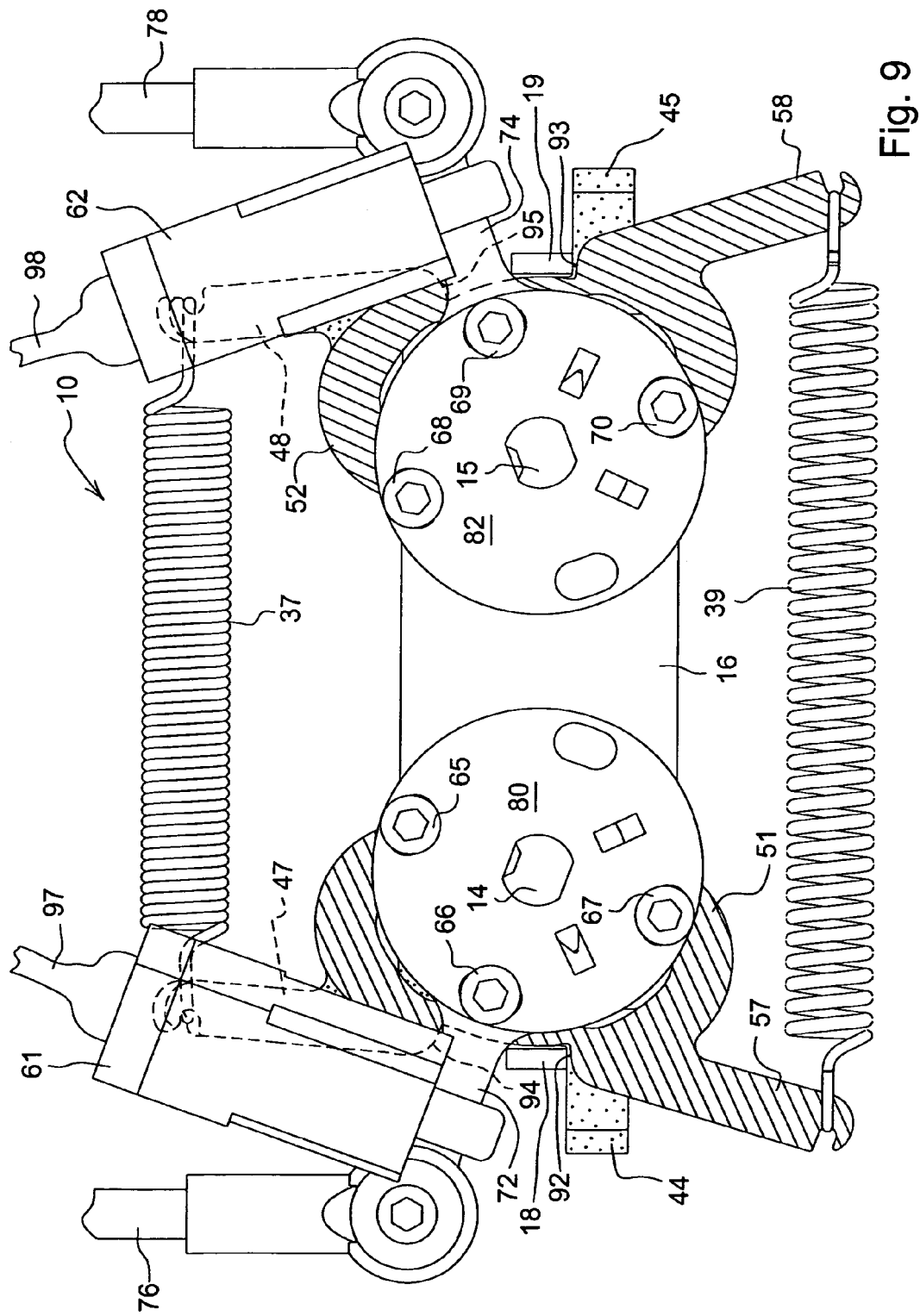
FIG. 9 is a side view of an embodiment of a return to neutral mechanism in which both the left and right pumps are in full forward.

FIG. 9 shows an embodiment of return to neutral mechanism 10 in which both operator controls 76, 78 and control levers 72, 74 for the left and right pumps are in the full forward position. Left input control lever 72 causes left lower RTN control arm 51 to pivot by contacting tab 54. Right input control lever 74 causes right lower RTN control arm 52 to pivot by contacting tab 55. Pivoting of left lower RTN control arm 51 changes the state of plunger switch 61, here shown in a released or extended condition. Pivoting of right lower RTN control arm 52 changes the state of plunger switch 62, here shown in a released or extended condition. Pivoting of left and right lower RTN control arms 51, 52 also stretches and extends spring 39 between legs 57 and 58 of the lower RTN control arms. Left lower RTN control arm may reach a maximum or full forward position when shoulder 92 contacts tab 18 of the neutral locating plate. Right lower RTN control arm 52 may reach a maximum or full forward position when shoulder 93 contacts tab 19 of the neutral locating plate. Both upper RTN control arms 41, 42 remain in their mechanical neutral positions. Tab 44 of left upper RTN control arm 41, and tab 45 of right upper RTN control arm 42, remain in contact with tabs 18, 19 of the neutral locating plate.

Having described the preferred embodiment, it will become apparent that various modifications can be made without departing from the scope of the invention as defined in the accompanying claims.

The invention claimed is:
1. A return to neutral mechanism for a dual hydrostatic transmission having first and second hydrostatic pumps with first and second trunion shafts, comprising:
a first pair of return to neutral control arms mounted on an axis that is coaxial with and independent of the first trunion shaft, one of the first pair of return to neutral control arms pivoting in a first direction if the first hydrostatic pump is in forward, and the other of the first pair of return to neutral control arms pivoting in a second direction if the first hydrostatic pump is in reverse;
a second pair of return to neutral control arms pivoting on an axis that is coaxial with and independent of the second trunion shaft, one of the second pair of return to neutral control arms pivoting in a first direction if the second hydrostatic pump is in forward, and the other of the second pair of return to neutral control arms pivoting in a second direction if the second hydrostatic pump is in reverse;

springs biasing the return to neutral control arms toward a neutral position; and first and second switches mounted to one of the first pair of return to neutral control arms and one of the second pair of return to neutral control arms respectively, the first switch being in a first state only if the first pair of return to neutral control arms are in the neutral position, and the second switch being in a first state only if the second pair of return to neutral control arms are in the neutral position;

wherein the springs extend between one of the first pair of return to neutral control arms and one of the second pair of return to neutral control arms.

2. The return to neutral mechanism of claim 1 further comprising a neutral locating plate mounted to the dual hydrostatic transmission and having a pair of tabs toward which the return to neutral control arms are biased in their neutral positions.

3. The return to neutral mechanism of claim 1 wherein the switches are plunger type switches.

4. The return to neutral mechanism of claim 1 further comprising a hub mounted to each trunion shaft, each hub providing a rotational axis around which each return to neutral control arm rotates independently of the hub.

5. A return to neutral mechanism for a dual hydrostatic transmission between an engine and a pair of traction drive wheels, the dual hydrostatic transmission having first and second hydraulic pumps, each pump having a trunion shaft connected to an independently movable operator control, comprising:

first and second pairs of return to neutral control arms, one of each first pair of return to neutral control arms connected to one of each second pair of return to neutral control arms by springs biasing both arms toward a neutral position; each return to neutral control arm moving in response to movement of an operator control; and a plurality of switches mounted to the return to neutral control arms, the switches enabling starting of the engine if every return to neutral control arm is in a neutral position, the switches disabling starting of the engine if at least one return to neutral control arm is out of the neutral position.

6. The return to neutral mechanism of claim 5 wherein each return to neutral control arm is pivotable on an axis that is coaxial with and independently rotatable around each trunion shaft.

7. The return to neutral mechanism of claim 5 wherein each switch is mounted to a return to neutral control arm that pivots to change the switch between a first state enabling starting of the engine and a second state disabling starting of the engine.

8. The return to neutral mechanism of claim 5 wherein each operator control is a pivotable stick.

9. A return to neutral mechanism for a dual hydrostatic transmission between an engine and a pair of traction drive wheels, comprising:

first and second operator controls connected to first and second trunion shafts for first and second hydrostatic pumps;

a first pair of return to neutral control arms for the first pump, and a second pair of return to neutral control arms for the second pump, each return to neutral control arm independently pivoting around a hub on the trunion shaft and biased toward a neutral position;

a first switch having a first state only if both of the first pair of return to neutral control arms are in the neutral position, and a second switch having a first state only if both of the second pair of return to neutral control arms are in the neutral position, the engine enabled to start only if both switches are in the first state; and at least one spring between the first pair of return to neutral control arms and the second pair of return to neutral control arms, the spring urging the return to neutral control arms toward the neutral position.

10. The return to neutral mechanism of claim 9 wherein the first switch is mounted to one of the first pair of return to neutral control arms and the second switch is mounted to one of the second pair of return to neutral control arms.

11. The return to neutral mechanism of claim 9 wherein the first and second operator controls are pivotable sticks.

12. The return to neutral mechanism of claim 9 wherein the first and second return to neutral control arms pivot on axes that are coaxial with the trunion shafts.

13. The return to neutral mechanism of claim 9 wherein one of the return to neutral control arms in a pair pivots if the corresponding operator control and hydrostatic pump moves to a forward position, and the other of the return to neutral control arms in a pair pivots in the opposite direction if the corresponding operator control and hydrostatic pump moves to a reverse position.

14. The return to neutral mechanism of claim 9 further comprising a neutral locating plate mounted to the hydrostatic transmission and providing stops for the return to neutral control arms.

15. The return to neutral mechanism of claim 14 further comprising a tab extending from each return to neutral control arm contacting one of the stops on the neutral locating plate defining the neutral position.

16. The return to neutral mechanism of claim 14 wherein each return to neutral control arm includes a shoulder that contacts one of the stops of the neutral locating plate if the arm reaches a maximum position.

17. A return to neutral mechanism for a dual hydrostatic transmission between an engine and a pair of traction drive wheels, comprising:

first and second operator controls connected to first and second trunion shafts for first and second hydrostatic pumps;

a first pair of return to neutral control arms for the first pump, and a second pair of return to neutral control arms for the second pump, each return to neutral control arm independently pivoting around a hub on the trunion shaft and biased toward a neutral position;

a first switch having a first state only if both of the first pair of return to neutral control arms are in the neutral position, and a second switch having a first state only if both of the second pair of return to neutral control arms are in the neutral position, the engine enabled to start only if both switches are in the first state;

wherein the hubs further comprise mounting flanges.

18. The return to neutral mechanism of claim 17 further comprising input control levers mounted to the flanges, and the operator controls are pivotably connected to the input control levers.

19. The return to neutral mechanism of claim 18 wherein the flanges have oval holes permitting adjusting the axial position of each input control levers in relation to the axial position of the flange.

* * * * *